US011512806B1

(12) United States Patent
Bond, Jr. et al.

(10) Patent No.: US 11,512,806 B1
(45) Date of Patent: *Nov. 29, 2022

(54) WATERPROOF HIGH PRESSURE PIPE AND FITTING RESTRAINT SYSTEM

(71) Applicant: GULFSTREAM SERVICES, INC., Houma, LA (US)

(72) Inventors: Robert Barry Bond, Jr., Houma, LA (US); James Brian Bordelon, Ville Platte, LA (US); Mark P. Charpentier, Houma, LA (US); Michael F. Mire, Kenner, LA (US)

(73) Assignee: GULFSTREAM SERVICES, INC., Houma, LA (US)

( * ) Notice: Subject to any disclaimer, the term of this patent is extended or adjusted under 35 U.S.C. 154(b) by 235 days.

This patent is subject to a terminal disclaimer.

(21) Appl. No.: 16/544,125

(22) Filed: Aug. 19, 2019

Related U.S. Application Data

(63) Continuation of application No. 14/965,527, filed on Dec. 10, 2015, now abandoned.

(Continued)

(51) Int. Cl.
*F16L 57/02* (2006.01)
*F16L 55/00* (2006.01)

(52) U.S. Cl.
CPC .............. *F16L 57/02* (2013.01); *F16L 55/005* (2013.01)

(58) Field of Classification Search
CPC . F16L 3/26; F16L 55/005; F16L 57/00; F16L 57/02

(Continued)

(56) References Cited

U.S. PATENT DOCUMENTS 2,746,773 A ‡ 5/1956 Bily ...................... F16L 55/005
285/11
3,197,240 A ‡ 7/1965 Lindberg .............. F16L 55/005
285/11

(Continued)

FOREIGN PATENT DOCUMENTS

| EP | 0167425 | ‡ | 1/1986 |
| GB | 2157757 | ‡ | 10/1985 |

(Continued)

OTHER PUBLICATIONS

Numbered photographs of apparatus offered for sale at least as early as Sep. 2012. These numbered photographs were previously submitted to the USPTO in U.S. Appl. No. 61/760,956, filed Feb. 5, 2013 by the Applicant/Assignee, Gulfstream Services, Inc.

*Primary Examiner* — Kevin F Murphy
*Assistant Examiner* — Jonathan J Waddy
(74) *Attorney, Agent, or Firm* — Garvey, Smith & Nehrbass, Patent Attorneys, L.L.C.; Charles C. Garvey, Jr.; Julie Rabalais Chauvin

(57) ABSTRACT

A restraint system for use in securing temporary flow lines that include multiple pipe sections, each pair of pipe sections connected together with a fitting or coupling such as a hammer joint coupling. The system includes multiple pluralities of endless loop slings connected end to end with a cow hitch or girth hitch knot. Disconnectable fittings (e.g., shackles) are placed every three or more slings so that easy disassembly is afforded in case of leakage or other failure. In one embodiment, a waterproof sleeve is an outer layer that surrounds or encapsulates an inner layer so that the inner layer remains dry and thus will not freeze.

20 Claims, 8 Drawing Sheets

Related U.S. Application Data

(60) Provisional application No. 62/235,224, filed on Sep. 30, 2015, provisional application No. 62/090,155, filed on Dec. 10, 2014.

(58) Field of Classification Search
USPC ................................ 137/343, 377; 285/117
See application file for complete search history.

(56) References Cited

U.S. PATENT DOCUMENTS

| | | | | |
|---|---|---|---|---|
| 3,360,838 | A ‡ | 1/1968 | Comer | D02G 1/0266 28/154 |
| 3,837,523 | A ‡ | 9/1974 | Koboldt | B65D 17/401 220/26 |
| 3,859,692 | A ‡ | 1/1975 | Waterman | F16L 55/005 24/300 |
| 4,333,675 | A ‡ | 6/1982 | Wirkkala | B66C 1/12 24/122 |
| 4,484,962 | A ‡ | 11/1984 | Dienes | H02G 15/08 156/31 |
| 4,549,332 | A ‡ | 10/1985 | Pouliot | F16L 55/005 24/115 |
| 4,553,635 | A ‡ | 11/1985 | Johnson | A01M 31/02 182/18 |
| 4,890,363 | A ‡ | 1/1990 | Cross | F16L 55/005 24/129 |
| 5,507,533 | A ‡ | 4/1996 | Mumma | F16L 55/005 285/11 |
| 5,689,862 | A ‡ | 11/1997 | Hayes | F16L 55/005 24/279 |
| 5,873,608 | A ‡ | 2/1999 | Tharp | F16L 55/005 285/11 |
| 6,192,558 | B1 ‡ | 2/2001 | Badura | F16B 45/02 24/599 |
| 6,298,882 | B1 ‡ | 10/2001 | Hayes | F16L 55/005 138/11 |
| 6,481,457 | B2 ‡ | 11/2002 | Hayes | F16L 55/005 137/37 |
| 6,596,015 | B1 ‡ | 7/2003 | Pitt | A61B 17/0469 606/23 |
| 6,837,523 | B2 ‡ | 1/2005 | Surjaatmadja | F16L 57/00 285/1 |
| 7,568,333 | B2 ‡ | 8/2009 | St. Germain | D07B 7/14 57/201 |
| 7,802,823 | B2 ‡ | 9/2010 | Piantoni | F16L 55/005 285/11 |
| 8,540,295 | B2 ‡ | 9/2013 | Babinchak | B66C 1/18 294/74 |
| 8,689,534 | B1 ‡ | 4/2014 | Chou | F16G 15/12 59/78 |
| 9,890,890 | B2 ‡ | 2/2018 | Bond, Jr. | F16L 55/005 |
| 9,920,870 | B2 ‡ | 3/2018 | Bond, Jr. | F16L 55/005 |
| 10,247,346 | B2 ‡ | 4/2019 | Bond, Jr. | F16L 55/005 |
| 10,415,736 | B2 | 9/2019 | Bond, Jr. et al. | |
| 2002/0083978 | A1 ‡ | 7/2002 | Hayes | F16L 55/005 137/377 |
| 2002/0095165 | A1 ‡ | 7/2002 | Chan | A61B 17/0469 606/14 |
| 2002/0163184 | A1 ‡ | 11/2002 | Blair | F16B 2/26 285/11 |
| 2003/0036345 | A1 ‡ | 2/2003 | Conner | A22B 5/06 452/18 |
| 2010/0077718 | A1 ‡ | 4/2010 | Wienke | B66C 1/125 59/84 |
| 2010/0263760 | A1 ‡ | 10/2010 | Gayaut | F16L 3/18 138/107 |
| 2011/0298231 | A1 ‡ | 12/2011 | Dohse | B66C 1/12 294/74 |
| 2013/0248004 | A1 ‡ | 9/2013 | Money | F16L 55/005 137/15.08 |
| 2013/0319565 | A1 ‡ | 12/2013 | St. Germain, Jr. | F16L 3/04 138/106 |
| 2013/0341470 | A1 ‡ | 12/2013 | Lee | F16L 55/005 248/68.1 |
| 2014/0145428 | A1 ‡ | 5/2014 | Meadows | F16L 35/00 285/117 |
| 2014/0217761 | A1 ‡ | 8/2014 | Bond, Jr. | F16L 55/005 294/74 |
| 2015/0167868 | A1 | 6/2015 | Boncha | |
| 2015/0176736 | A1 ‡ | 6/2015 | O'Neil | F16L 43/02 285/81 |
| 2015/0192233 | A1 ‡ | 7/2015 | Meadows | F16L 35/00 285/11 |
| 2018/0224025 | A1 ‡ | 8/2018 | Harris | F16L 3/02 |
| 2018/0266611 | A1 ‡ | 9/2018 | Bond, Jr. | F16L 55/005 |
| 2019/0063659 | A1 ‡ | 2/2019 | Gamba | F16G 11/14 |

FOREIGN PATENT DOCUMENTS

| | | | |
|---|---|---|---|
| GB | 2439550 | ‡ | 1/2008 |
| SU | 286410 A1 | ‡ | 11/1970 |
| WO | WO-2013184521 | ‡ | 12/2013 |
| WO | WO-2014123963 A1 | ‡ | 8/2014 |

‡ imported from a related application

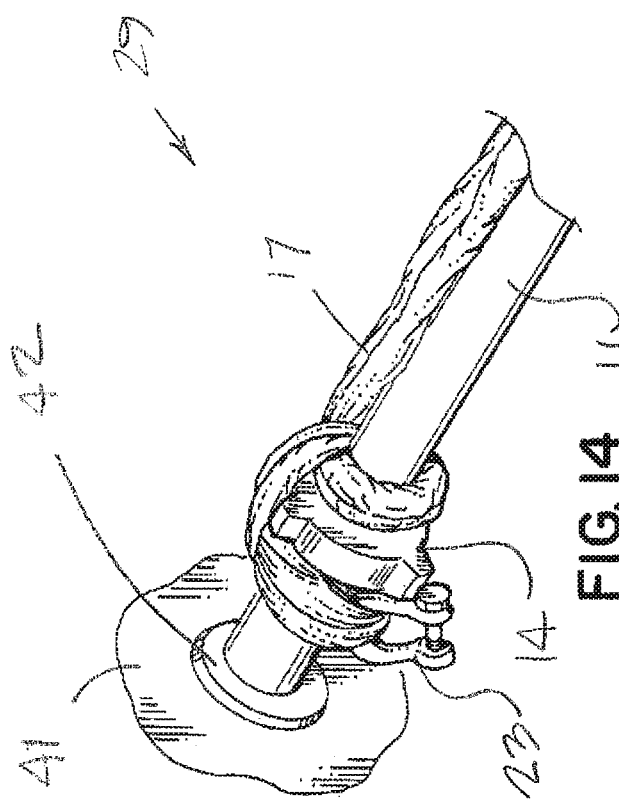
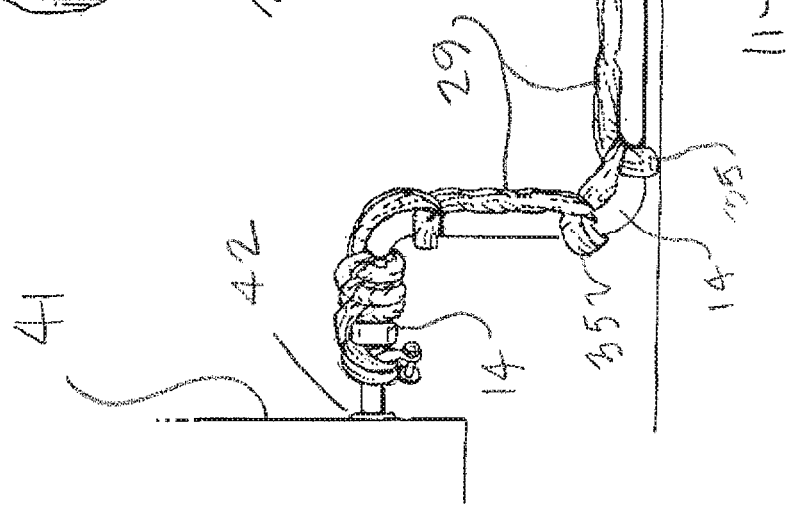
FIG. 14
FIG. 15

WATERPROOF HIGH PRESSURE PIPE AND FITTING RESTRAINT SYSTEM

CROSS-REFERENCE TO RELATED APPLICATIONS

This application is a continuation of U.S. patent application Ser. No. 14/965,527, filed 10 Dec. 2015, which claims the benefit of U.S. Provisional Patent Application Ser. No. 62/090,155, filed 10 Dec. 2014, and U.S. Provisional Patent Application Ser. No. 62/235,224, filed 30 Sep. 2015, each of which is hereby incorporated herein by reference.

Priority of U.S. Provisional Patent Application Ser. No. 62/090,155, filed 10 Dec. 2014, and U.S. Provisional Patent Application Ser. No. 62/235,224, filed 30 Sep. 2015, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to devices for restraining, restricting, or arresting movement of temporary piping such as high pressure pipeline or flow lines during a catastrophic failure. More particularly, the present invention relates to a method and apparatus for restraining high pressure pipe and fittings wherein a series of endless loop slings are joined end to end with hitch type connections (such as a cow hitch, sling hitch, lanyard hitch or other like knot) and wherein each of first and second lengths of assembled slings are connected end to end with disconnectable connections (e.g., shackles) that enable service or maintenance of a selected section of the high pressure piping system without disassembly of all of the endless loop slings, and wherein the assembly of slings and connectors is knotted to the pipeline (e.g., with half hitch knots) at selected intervals.

2. General Background of the Invention

In the offshore oil and gas industry, temporary high pressure pipelines are often employed at or near a drilling platform or drilling rig or upon a deck of a drilling platform or drilling rig. These high pressure pipelines are assembled using couplings which are also high pressure rated. If one of these sections of pipe or coupling that make up the high pressure flow line fail or leak, the pipe can violently move, potentially causing injury or death to personnel and/or damage to equipment. For example, pipe sections can come completely apart when a failure occurs.

Patents have issued for restraint systems designed to restrain a flow line or parts thereof. The following are examples of such patents:

U.S. Pat. Nos. 2,746,773; 5,689,862; 6,481,457 (wherein each of these patents is hereby incorporated herein by reference).

The '457 Patent is directed to a "Safety Restraint Assembly for High Pressure Flow Line". The patent is owned by S.P.M. Flow Controls, Inc. of Fort Worth, Tex. (hereinafter "S.P.M.").

A Society of Petroleum Engineers publication which is identified by the numeral SPE 24619 and entitled "Restraining System to Help Contain Well Flow Lines and Equipment During Rupture for Increased Safety" was said to have been prepared for presentation at the 87th Annual Technical Conferences and Exhibition of the Society of Petroleum Engineers held in Washington, D.C., 4-7 Oct. 1992.

Incorporated herein by reference are U.S. Provisional Patent Application Ser. No. 61/760,956, filed 5 Feb. 2013; U.S. patent application Ser. No. 14/173,194, filed 5 Feb. 2014 (published as US 2014/0217761 on 7 Aug. 2014); International Application Number PCT/US2014/014808, filed 5 Feb. 2014 (published as WO 2014/123963 on 14 Aug. 2014); and U.S. patent application Ser. No. 14/765,768, filed 4 Aug. 2015. However, this is not a continuation, continuation-in-part, or divisional of any prior application.

BRIEF SUMMARY OF THE INVENTION

The present invention provides a restraint system for use in securing temporary flow lines that include multiple pipe sections, each pair of sections connected together with a fitting such as a pressure holding coupling (e.g., a hammer union or coupling).

The present invention thus provides a restraint system for use in securing temporary flowlines that include multiple pipe sections, each pair of pipe sections connected together with fittings. Such temporary piping systems are commonly used in sizes/diameters 2 inch (5.08 centimeters), 3 inch (7.62 centimeters), 4 inch (10.16 centimeters) as examples. The system includes an assembly of polyester round slings, round slings or loop slings (preferably endless loop slings) connected end-to-end, each sling having end portions that are secured to one or more other endless slings. The loops or slings can be synthetic round slings as defined by ASME B30.9. Core yarns of each sling can be of a synthetic fiber. Covers of the slings can be woven from synthetic yarns. The synthetic round slings can be fabricated from core yarns wound together with multiple turns and enclosed in a protective cover(s). The cover and core can be of the same type of material. When the core and cover are of a different type, the thread should be as the same type yarn as the core. Stitching, if used, should be of the type to prevent unraveling.

Disconnectable fittings preferably join one assembly of multiple slings to another assembly of multiple slings.

The disconnectable fitting is preferably not a part of a sling.

In one embodiment, the disconnectable fitting can be a shackle.

In one embodiment, each endless sling is preferably wrapped around the piping system at least one 360° wrap.

In one embodiment, there are preferably at least three endless loop slings in each assembly.

In one embodiment, each endless loop sling assembly preferably encircles a pipe section next to a fitting.

The present invention provides a method for restraining a temporary flow line that includes multiple pipe sections, each pair of sections preferably connected together with a disconnectable coupling.

The method provides first and second pluralities of connected endless sling loops, each plurality preferably including at least three endless loop slings connected end to end with a cow hitch, girth hitch or sling hitch or other hitch knot.

The endless loop slings are preferably connected end to end and connecting each plurality to another plurality with a disconnectable connector.

In one embodiment, the disconnected connector is preferably not a part of an endless sling.

In one embodiment, the connector is preferably metallic.

In one embodiment, the connector is preferably a shackle.

In one embodiment, the connector is preferably a fitting having two parts, one part that disconnects from the other part.

The present invention provides a restraint system for use in securing temporary flowlines that include multiple pipe sections, each pair of sections preferably connected together with fittings. An assembly of endless loop slings are preferably connected end-to-end, each sling having end portions that are secured to one or more other endless slings.

Disconnectable fittings preferably join one assembly of multiple endless slings to another assembly of multiple endless slings;

The disconnectable fitting is preferably not a part of an endless loop sling.

The assembly of flowlines is preferably connected at intervals to the pipe sections and fittings using knotted connectors.

In one embodiment, the disconnectable fitting is preferably a shackle.

In one embodiment, each endless sling is preferably tied to the piping system with half hitch knots.

In one embodiment, there are preferably between 2 and 12 endless loop slings in each assembly.

In one embodiment, each endless loop sling assembly is preferably tied to a pipe section next to a fitting.

The present invention provides a method for restraining a temporary flow line that includes multiple pipe sections, each pair of sections preferably connected together with a disconnectable coupling, the system providing first and second pluralities of connected endless sling loops.

Each plurality includes at least three endless loop slings connected end to end with a knotted connection.

The slings are preferably connected end to end connecting each plurality to another plurality with a disconnectable connector.

The slings are preferably knotted to the flow line at intervals using half hitch or other knotted connections.

In one embodiment, the disconnected connector is preferably not a part of an endless sling.

In one embodiment, the connector is preferably a fitting having two parts, one part that disconnects from the other part.

In one embodiment the two parts are preferably a shackle bow and a shackle pin.

Anchors can be used to anchor the extreme ends of the slings or loops or round slings. Such an anchor can be a pump truck, well head, immovable object. The connection to the immovable object can be a choke hitch or shackle.

The polyester round slings are preferably used to form a hitch connection parallel to the piping installation, with hitch connections before and after each pipe connection/ swivel and at regular intervals (e.g. five feet (1.524 meters)) on straight joints of pipe. At the end of a run of several slings connected end to end, the last sling is preferably connected to an immovable object such as a well head or other immovable object using a shackle or like structural connector.

The present invention includes a restraint system for use in securing temporary flowlines that include multiple pipe sections, each pair of sections connected together with one or more fittings. The system can include an assembly of multiple endless loop slings connected end-to-end, one sling having end portions, an end portion secured to one or more of said other slings with a cow hitch knot connection. A plurality of disconnectable fittings can each join one assembly of multiple slings to another assembly of multiple slings. The disconnectable fitting is preferably not a said sling. The slings can be attached to the assembly of pipe sections and fittings with knots at spaced apart positions preferably along the temporary flow line.

In one embodiment, the slings are preferably of multiple layers: 1) a central core surrounded by a waterproof sleeve; 2) and an outer layer that surrounds the waterproof sleeve and core.

In one embodiment, the disconnectable fitting can be a shackle.

In one embodiment, the knot can include a wrap of a said sling around the piping system at least one 360° wrap.

In one embodiment, each sling assembly can include three or more endless loop slings in each assembly.

In one embodiment, the said knot can secure each endless loop sling assembly to the pipe section encircling the pipe multiple times next to a said fitting.

In one embodiment, each sling assembly can include a sling that connects to two other side slings with first and second spaced apart cow hitch knots.

In one embodiment, there can be multiple spaced apart fittings and the assembly of endless loop slings encircles a pipe section multiple times in between two of said spaced apart fittings.

In one embodiment, the assembly of endless loop slings can encircle a said fitting multiple times and on opposing sides of said fitting.

In one embodiment, the slings can be of differing lengths.

In one embodiment, the slings can be of differing thicknesses.

The present invention includes a method for restraining a temporary flow line that includes multiple pipe sections, each pair of sections connected together with a disconnectable coupling. The method includes providing first and second sling assemblies, each assembly comprising multiple endless sling loops connected to one another. Each sling assembly can include at least three endless loop slings connected end to end, one of the endless loop slings being a middle sling that connects at spaced apart positions with a girth hitch knot joining one said sling to another said sling. The endless loop slings can be connected end to end connecting each plurality to another plurality with a disconnectable connector. The slings can be attached to the assembly of pipe sections and fittings with knots.

In one embodiment, each sling can have an inner core, middle or intermediate sleeve and an outer sleeve.

In one embodiment, at least one sleeve is preferably of a waterproof material.

In one embodiment, the disconnectable connector is preferably not a part of an endless sling.

In one embodiment, the connector can be metallic.

In one embodiment, the connector can be a shackle.

In one embodiment, the connector can be a fitting having two parts, one part that disconnects from the other part.

The present invention includes a restraint system for use in securing temporary flowlines that include multiple pipe sections, each pair of sections connected together with fittings. The system can have multiple assemblies of endless loop slings connected end-to-end, each assembly defined by one sling having an end portion that is secured to one or more other endless slings with a cow hitch knot. Disconnectable fittings can join one said assembly of multiple endless slings to another assembly of multiple endless slings, wherein the disconnectable fitting is not a said endless loop sling. The system further includes attaching the assemblies to the flowlines at intervals using a combination of knotted connectors that each encircle the flowline.

In one embodiment, the disconnectable fitting can be a shackle.

In one embodiment, each endless sling can be tied to the piping system with half hitch knots.

In one embodiment, there can be between 2 and 12 endless loop slings in each assembly.

In one embodiment, each endless loop sling assembly can be tied to a pipe section next to a fitting.

The present invention includes a method for restraining a temporary flow line that includes multiple pipe sections, each pair of sections connected together with a disconnectable coupling. The method includes providing multiple assemblies of connected endless sling loops. Each plurality can include at least three endless loop slings connected end to end with each sling attached to another said sling with a girth hitch knot. The assemblies can be connected end to end, one assembly connecting to another assembly with a disconnectable connector. The method can include knotting the slings to the flow line at intervals.

In one embodiment, each sling is preferably of multiple layers, preferably including an inner core, an intermediate sleeve surrounding the inner core, and an outer sleeve preferably surrounding the intermediate sleeve, at least one layer preferably being a waterproof sleeve that surrounds another of the layers.

In one embodiment, the disconnectable connector is not a part of an endless sling.

In one embodiment, the connector can be a fitting having two parts, one part that disconnects from the other part.

In one embodiment, the slings can be of differing lengths.

In one embodiment, the slings can be of differing diameters.

In one embodiment, the slings can be of a polyester material.

In one embodiment, the slings can be of a synthetic fiber material.

In one embodiment, a stronger but lighter restraint sling or cable is designed not to freeze. These restraints are usually contained in swimming-pool like enclosures designed to capture any oil leaking from flow lines (e.g., from Chiksan®). The enclosures can contain snow and water. Prior restraints could freeze in place, and sometimes needed to be cut (i.e. destroyed) in order to remove same from the piping or Chiksan®.

The apparatus of the present invention provides an outer covering (e.g. double layered polyester sleeve). Polyester yarns run through a machine with multiple (e.g. three (3)) strength levels (which can be color coded—e.g. grey, yellow, and orange (strongest)).

In one embodiment, a central or inner high strength rope is covered or encapsulated with a water proof or water tight sleeve such as a polyurethane covering (water impermeable and closed at each end) and a polyester sleeve (preferably one strength level better than the color coded strongest layer, e.g. orange). A waterproof sleeve mostly used with 3 inch (7.62 cm) OD Chiksan® (portable high pressure piping)—4 inch (10.16 cm) OD Chiksan® might require a stronger rope. The core rope is used with two extra layers, a waterproof second layer and outer wear-resistant layer.

In one embodiment, the present invention includes a method for restraining a temporary flow line that includes multiple pipe sections, each pair of sections connected together with a disconnectable coupling. Multiple assemblies of connected endless sling loops can be provided. Each plurality can include at least three endless loop slings connected end to end with each sling attached to another sling preferably with a girth hitch knot. The assemblies can be connected end to end, one assembly connecting to another assembly with a disconnectable connector. The slings can be knotted to the flow line at intervals. At least some of the slings can have an inner core surrounded by one or more waterproof sleeves that preferably disallow water flow to the inner core.

In one embodiment, the disconnectable connector is preferably not a part of an endless sling.

In one embodiment, the connector is preferably a fitting having two parts, one part that disconnects from the other part.

In one embodiment, there are at least two sleeves.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 14 is a partial perspective view illustrating the method of the present invention, illustrating an anchor at one end portion of a sling assembly;

FIG. 15 is a partial perspective view illustrating the method of the present invention, illustrating an anchor at one end portion thereof;

DETAILED DESCRIPTION OF THE INVENTION

Figure 1:
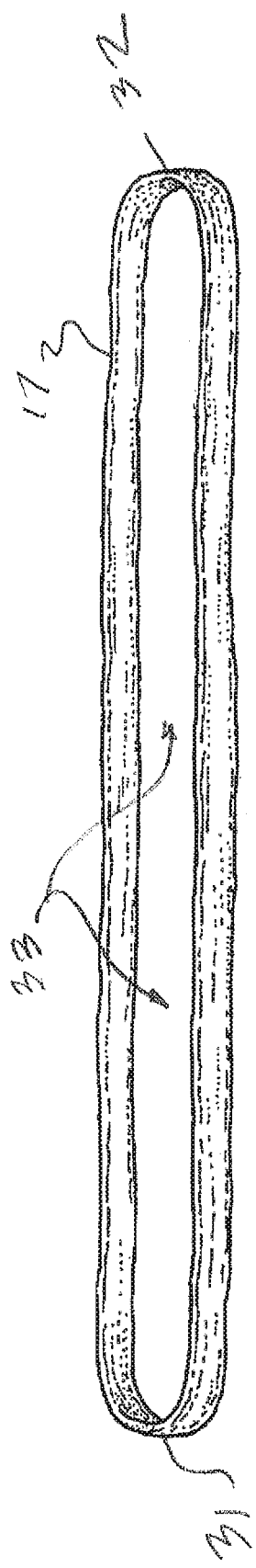
FIG. 1 is a perspective view of a preferred embodiment of the apparatus of the present invention illustrating one of the loop sling portions thereof.
Figure 2:
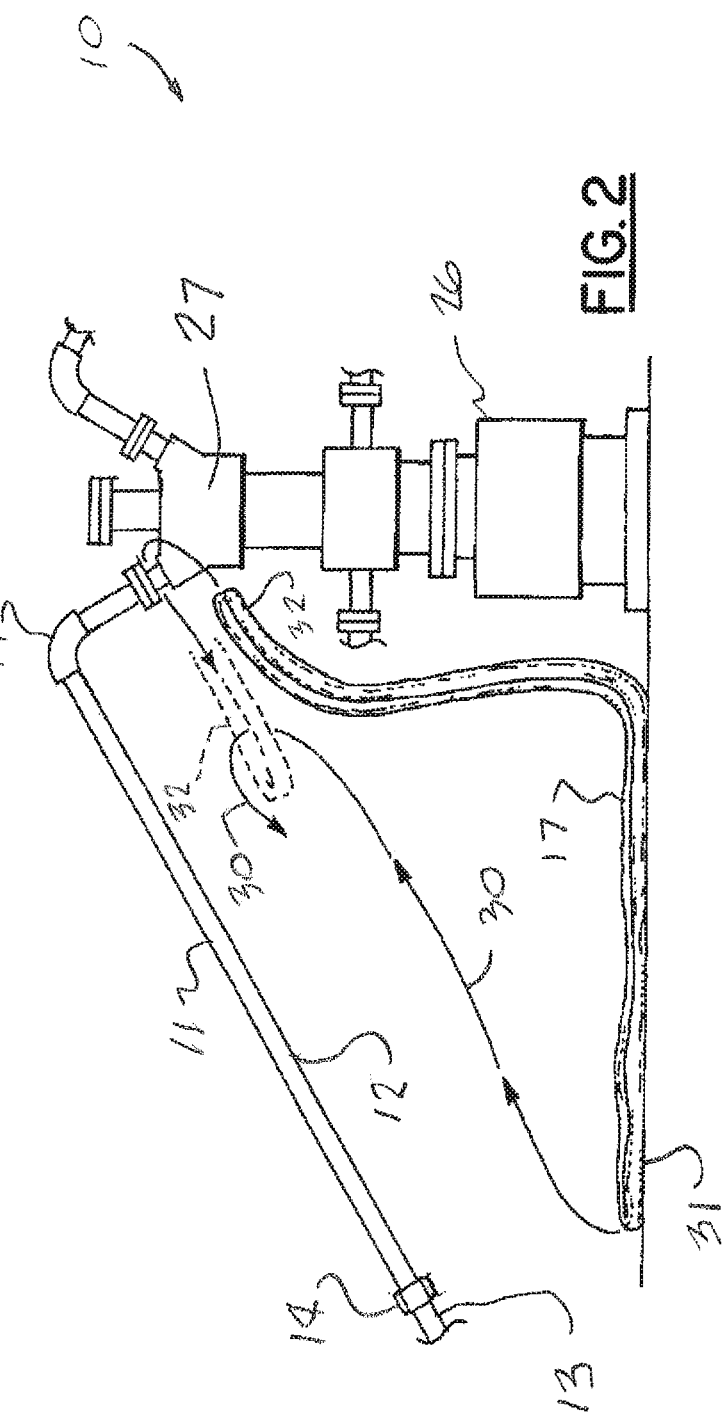
FIG. 2 is an elevation view illustrating a part of the method of the present invention.
Figure 3:
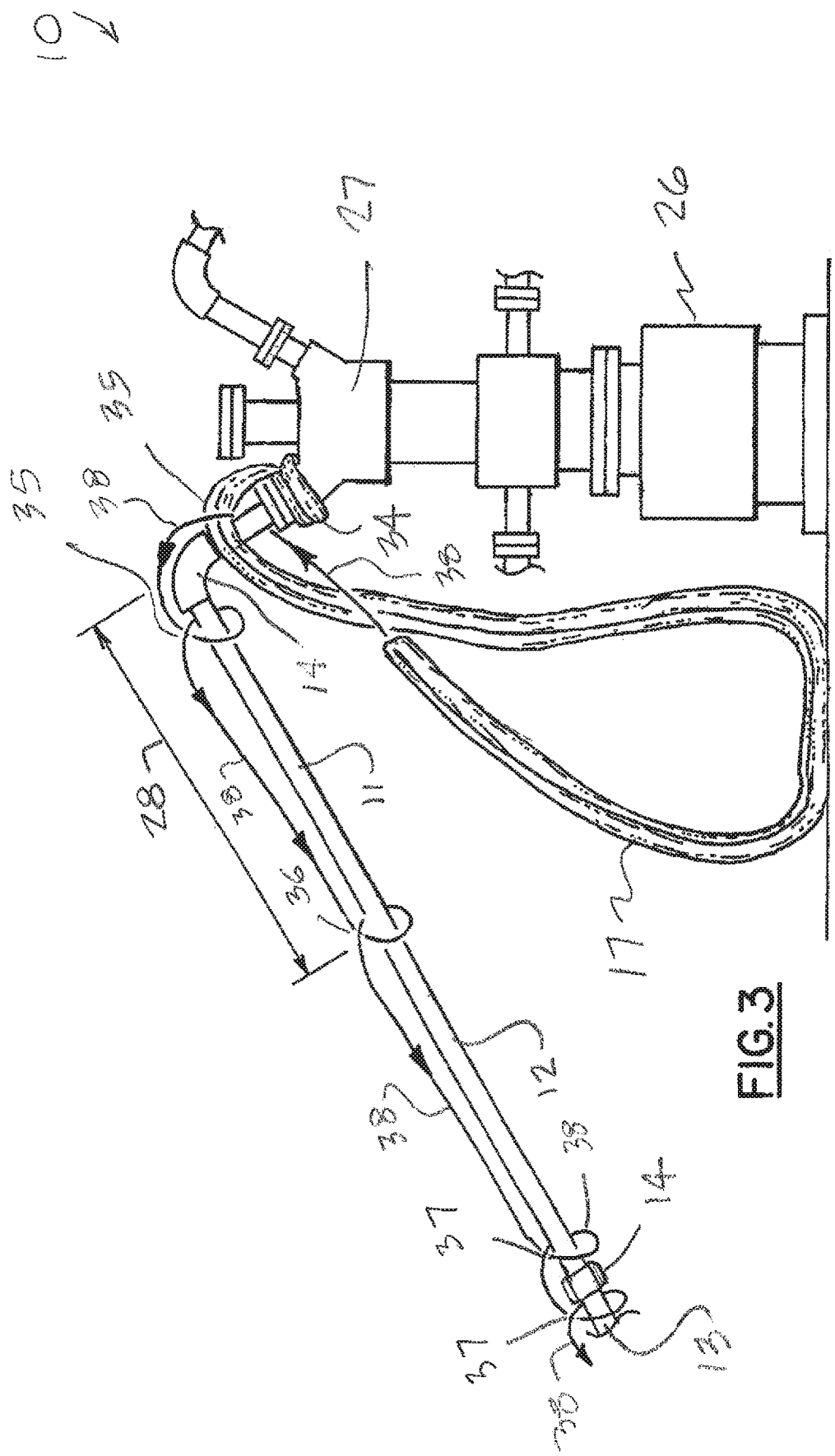
FIG. 3 is an elevation view illustrating a part of the method of the present invention.
Figure 4:
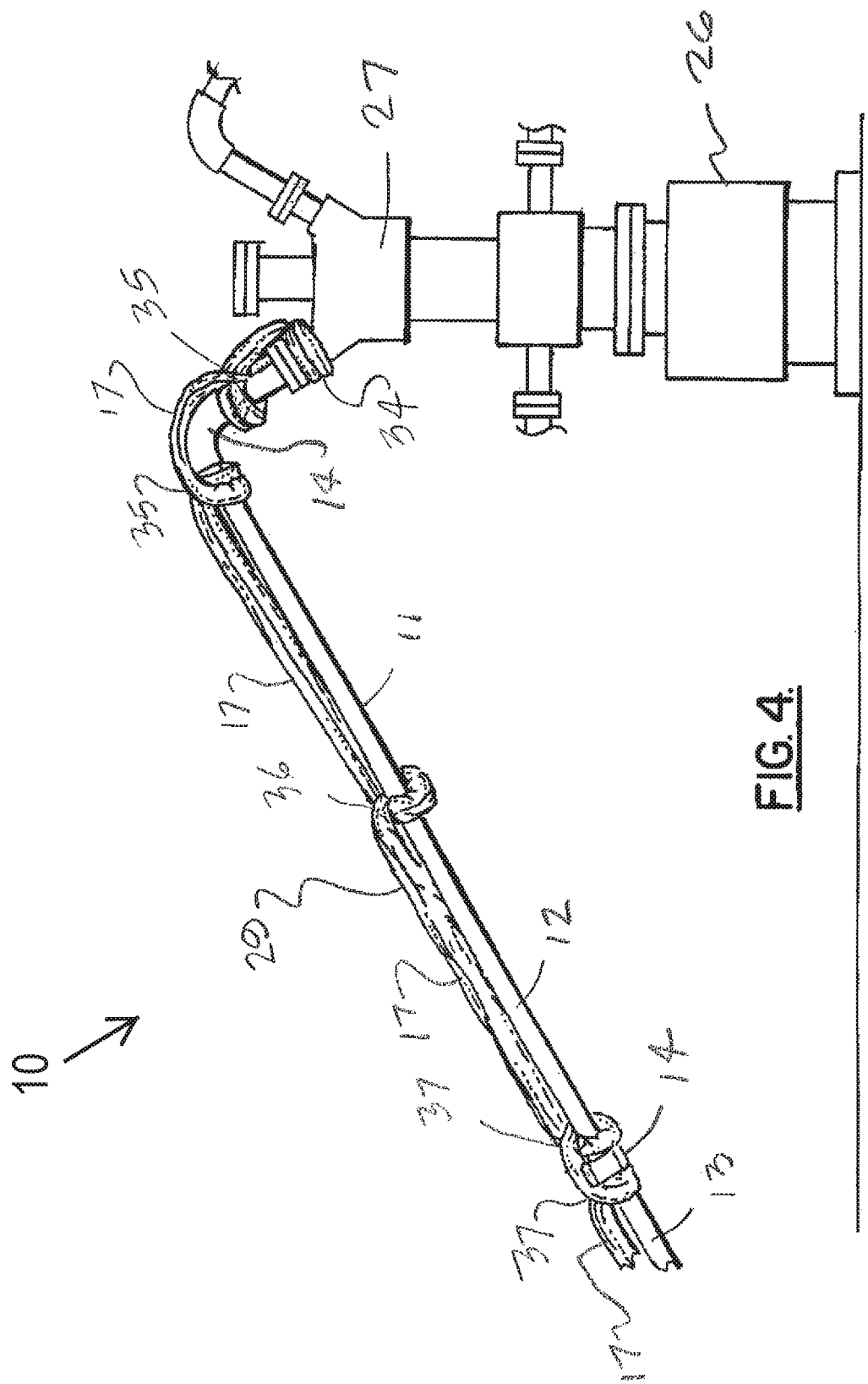
FIG. 4 is an elevation view illustrating a part of the method of the present invention.

FIGS. 1-16 show a preferred embodiment of the apparatus of the present invention designated generally by the numeral 10 in FIGS. 2-4. Restraint system 10 is used to secure a high pressure flow line or pipeline 11 that can be comprised of a plurality of pipe sections 12, 13 and fittings 14 (e.g., couplings, valves, elbows, tees or other fittings).

Two (2) pipe sections 12, 13 are usually connected at a selected fitting 14. However, the term "fitting" as used herein should be construed broadly to include anything that can be part of a piping system, pipeline or flowline. "Fitting" as used herein includes, but is not limited to, an elbow, tee, reducer, valve, coupling, hammer union, union, as examples. In such a high pressure flow line 11, multiple pipe sections are typically connected end to end with fittings, unions or couplings. The flow line 11 can include multiple straight sections 12, 13 of pipe and elbow or bend sections, tee fittings, couplings, unions, and the like. Such temporary high pressure flow lines, fittings and pipe joints are well known in the art. They are commonly employed on oil and gas platforms.

Figure 8:
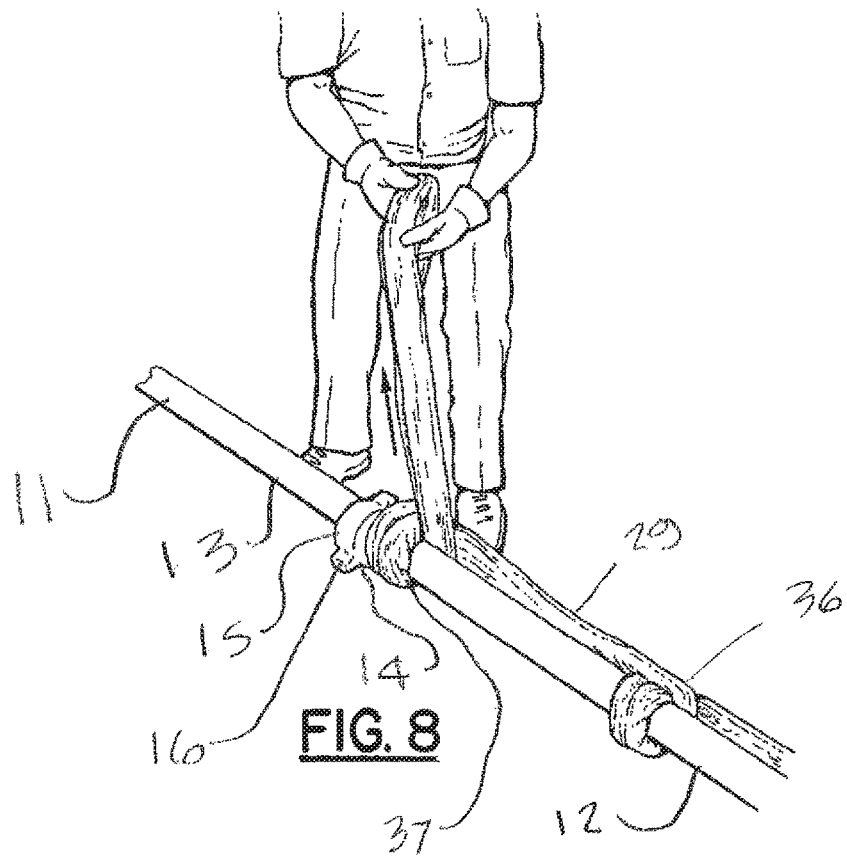
FIG. 8 is an elevation view illustrating a part of the method of the present invention.
Figure 9:
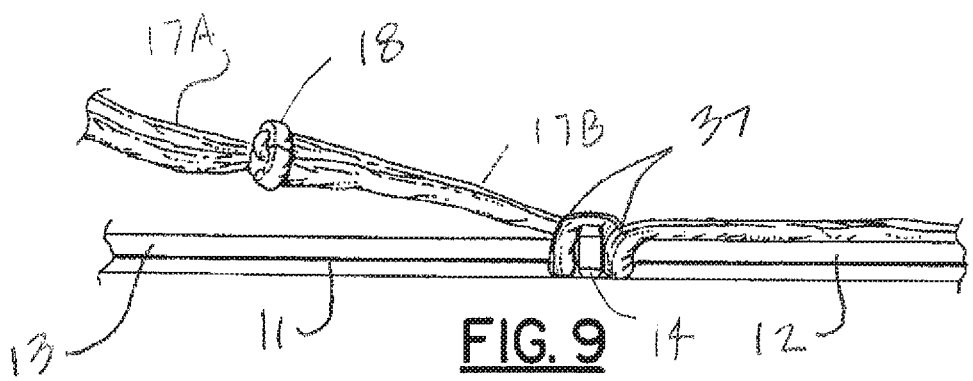
FIG. 9 is a fragmentary elevation view illustrating a connection of one loop sling to another loop sling using a shackle.
Figure 10:
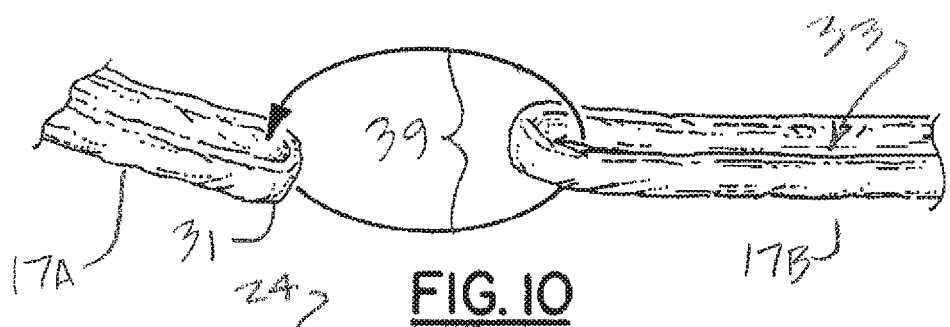
FIG. 10 is a fragmentary elevation view illustrating a connection of one loop sling to another loop sling using a shackle.

A fitting 14 (e.g., a coupling such as a hammer union 14, which is commercially available) can be used to join a pair of pipe sections 12, 13 together (see FIGS. 2 and 8). Such hammer unions, couplings or like fittings 14 are known in the art and commercially available. Coupling or fitting 14 can be a hammer union that includes a hammer nut 15 having projections 16 which can be pounded with a hammer to insure a tight seal for the connection of coupling or fitting 14 when it is used to join two pipe sections 12, 13 together. An example of a hammer union and seal arrangement can be seen in U.S. Pat. No. 6,764,109 entitled "Hammer Union and Seal Therefor". U.S. Pat. No. 6,764,109 is hereby incorporated herein by reference.

Figure 5:
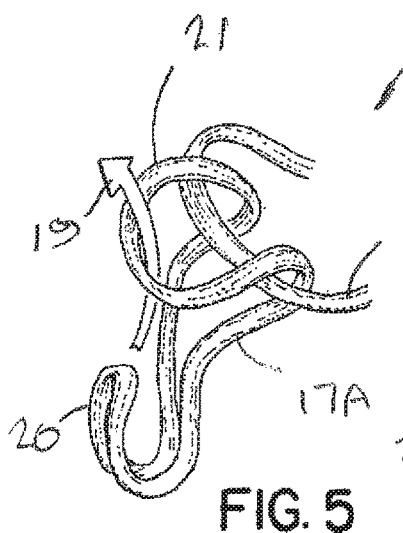
FIG. 5 is a fragmentary view illustrating a connection used to join one endless loop sling to another endless loop sling as part of the method of the present invention.
Figure 6:
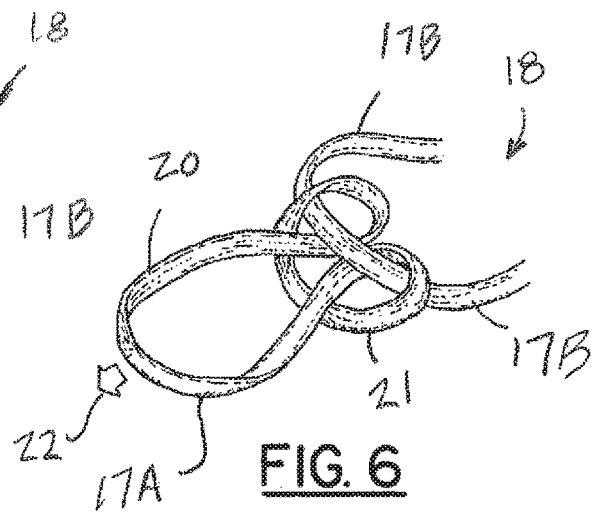
FIG. 6 is a fragmentary view illustrating a part of the method of the present invention.
Figure 16:
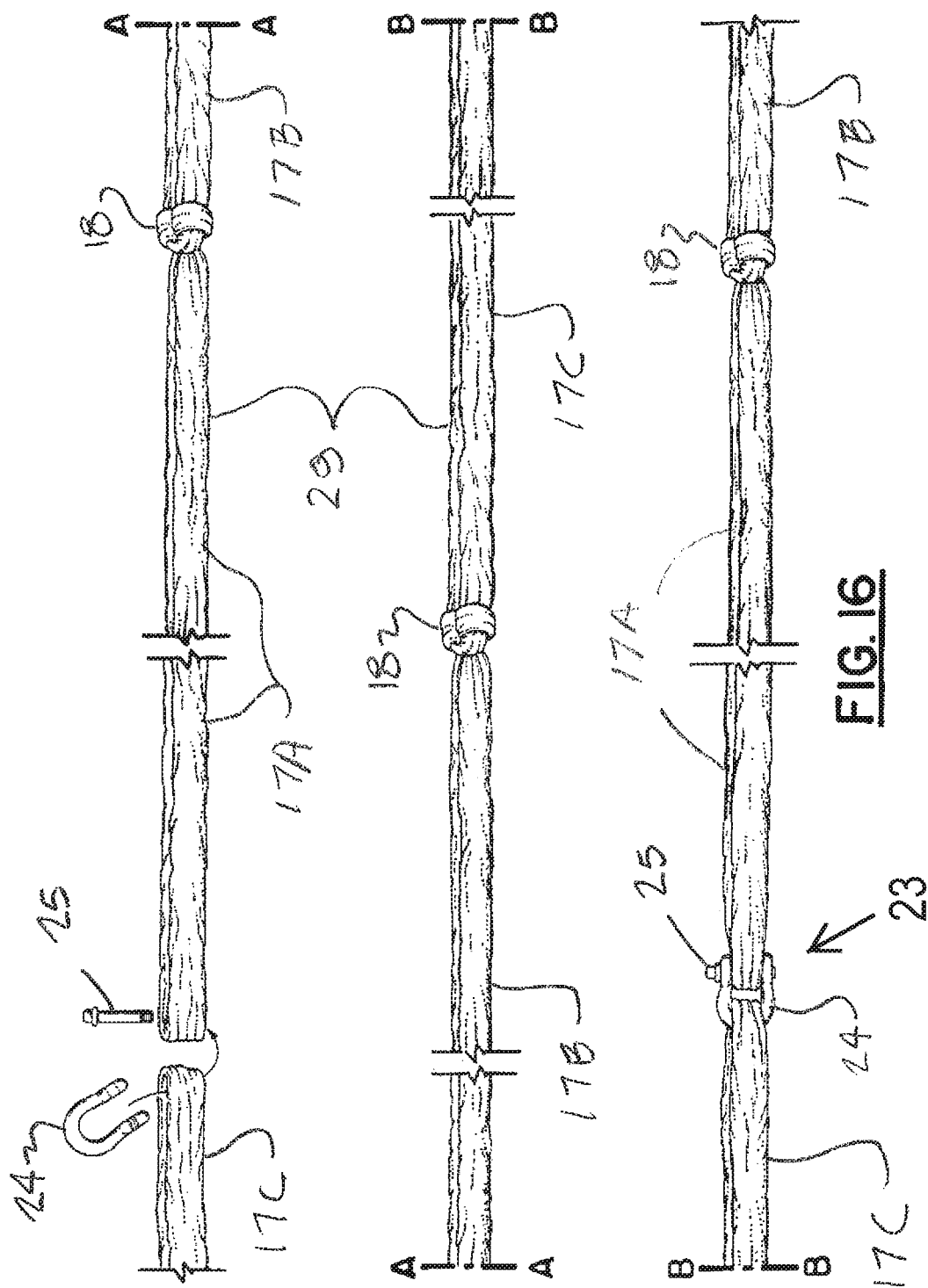
FIG. 16 is a partial view of a preferred embodiment of the apparatus of the present invention illustrating a sling assembly as used with the method of the present invention.

In FIGS. 5-6, there can be seen a knotted connection, such as a cow hitch or girth hitch knot 18 that joins one endless loop sling 17A to another endless loop sling 17B and to a third sling 17C (see FIG. 16). The slings 17A, 17B, 17C can be connected end to end as seen in FIG. 16 to form a sling assembly 29 (e.g., two or three or four slings connected together as shown in FIG. 16). Each sling 17A, 17B, 17C has ends 31, 32 and center 33 (see FIG. 1). A connection is made with a shackle 23 or other disconnectable connector to connect one sling assembly 29 to another sling assembly 29 (see FIGS. 10-16). The knot 18 of FIGS. 5-6 and 16 can be perfected to connect two slings 17A, 17B together by forming a first loop 20 and passing it through a second loop 21 as indicated by arrow 19 in FIG. 5 and pulling the first loop 20 through the second loop 21 until knot 18 is formed as indicated by arrow 22 in FIG. 6. The assembled slings 17A, 17B connected with knot 18 can be seen in FIGS. 5-6 and 16.

Figure 7:
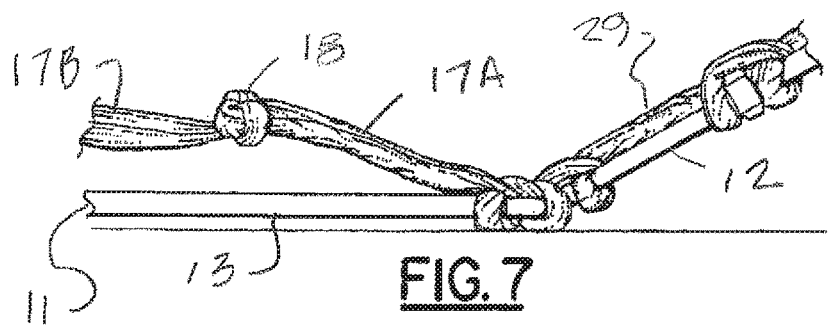
FIG. 7 is an elevation view illustrating a part of the method of the present invention.

Once two or more slings 17 are connected end to end as seen in FIGS. 7 and 16, an assembly 29 of such slings 17 (e.g., three slings 17A, 17B, 17C connected end-to-end) is connected to another assembly 29 of slings (e.g., three slings 17A, 17B, 17C connected end-to-end) with a disconnectable connector such as a shackle 23. Shackle 23 has two separable parts including bow 24 and pin 25 (see FIG. 11). Such shackles 23 are commercially available. In this fashion, if a leak is detected, only two shackles 23 next to or on opposing sides of the leak need be disconnected as opposed to having to disassemble all of the slings 17. This feature enables the disassembly of only a few slings 17 instead of the dozens or even hundreds of slings that might be employed to restrain a high pressure pipeline or piping system.

The assemblies 29 of slings 17A, 17B, 17C (e.g., three slings per assembly 29) are knotted to the pipe 11 and fittings 14 at selected intervals using half hitch or other knots (see FIGS. 2-4 and 7-16). In FIGS. 2-3, an anchor 27 is provided that can be part of an immovable object such as wellhead 26. In order to install the restraint system 10 of the present invention on a high pressure flow line 11, pipeline or piping system, one end portion of a sling assembly 29 is attached to an anchor 27 such as wellhead 26. FIGS. 2 and 3 illustrate such an attachment. A half hitch or cow hitch knot 18 can be used to prepare an assembly of slings 17A, 17B, 17C as shown in FIG. 16. That assembly 29 is then attached to the anchor 27 shown in FIGS. 2 and 3. End 31 is looped through the center of end 32 as illustrated by arrows 30 in FIG. 2. The knotted connection to anchor 27 is designated by the numeral 34 in FIG. 3.

Once an assembly of slings 17A, 17B, 17C is connected to anchor 27 at connection 34, arrows 38 illustrate that the assembly 29 of slings 17A, 17B, 17C is connected to the high pressure flow line 11 at intervals. At each connection to the pipeline 11, a knot can be used such as a hitch or half hitch knot 35. In FIG. 3, two half hitch or hitch knots 35 are used, one on each side of fitting 14 which fitting is an elbow in FIG. 3. For a length of pipe or section of pipe 12 or 13, half hitch or hitch knots 36 can be used at intervals (e.g., every five (5) feet (1.524 meters)) designated by the numeral 28 in FIG. 3. In FIG. 3, two more hitches or half hitch knots 37 are used on opposing sides of a fitting 14 which is a hammer union.

In FIGS. 4 and 7-9, the installation of an assembly 29 of endless loop slings 17A, 17B, 17C can be seen. Assembly 29 attaches to piping system 11 wherein knots 35, 36 and 37 have been completed. Once a first sling assembly 29 of, for example two or three or more, slings is affixed to the piping system 11 as shown in FIGS. 3 and 4, one sling assembly 29 of a plurality of slings 17 is then attached to another sling assembly 29 of a plurality of slings 17 using shackles 23 as shown in FIG. 16. In this fashion, only one or two shackles 23 need be disconnected should a leak occur. Users could then repair the damaged pipe section 12 or 13 or the damaged fitting 14 and then attach a sling assembly or assemblies 29 with shackles 23.

Figure 11:
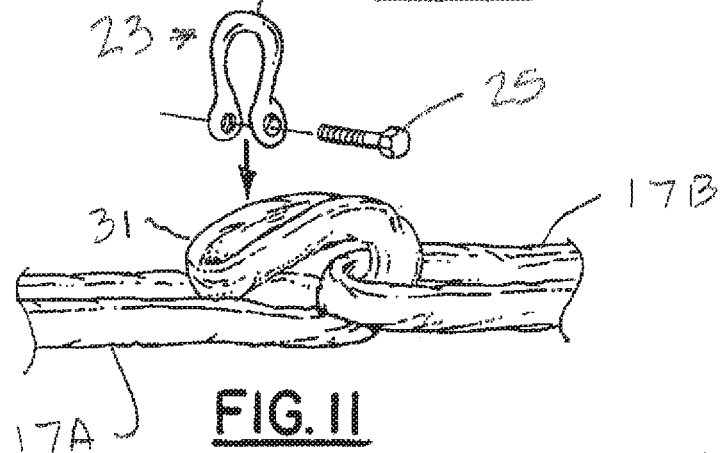
FIG. 11 is a fragmentary elevation view illustrating a connection of one loop sling to another loop sling using a shackle.
Figure 12:
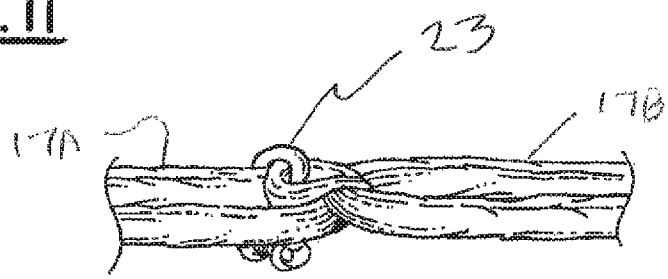
FIG. 12 is a fragmentary elevation view illustrating a connection of one loop sling to another loop sling using a shackle.
Figure 13:
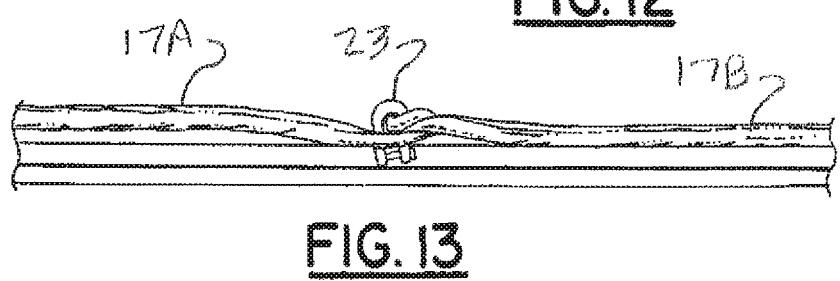
FIG. 13 is a fragmentary elevation view illustrating a connection of one loop sling to another loop sling using a shackle.

FIGS. 10-13 show an alternative method of attaching one loop sling 17A to another loop sling 17B using shackle 23. In FIGS. 10-13, a first loop sling 17A is connected to a second loop sling 17B by routing the first loop sling 17A through the open center 33 of the second loop sling 17B as illustrated by arrow 39 in FIG. 10. An end 31 of the loop sling 17A is then fastened to the sling 17A using shackle 23 as shown in FIGS. 11-13.

FIGS. 14 and 15 show an alternative anchoring arrangement wherein the anchor 41 connects to the piping system or pipe line 11 at connection 42. In FIGS. 14 and 15, fitting 14, such as a hammer union, is closely spaced to connection 42. A sling assembly 29 or sling 17 is connected to the pipe line 11 on opposing sides of the fitting or hammer union 14 with a shackle 23 connecting one portion of the sling 17 or sling assembly 29 to another portion of the sling or sling assembly 17, 29. This arrangement perfects an attachment of the sling assembly 29 to the pipe line 11 itself for providing an anchor at one end portion of the sling assembly 29. The sling assembly 29 is attached to the piping system or pipe line 11 using hitch knots or half hitch knots 35, 36, 37 as with the embodiment of FIG. 4.

Figure 17:
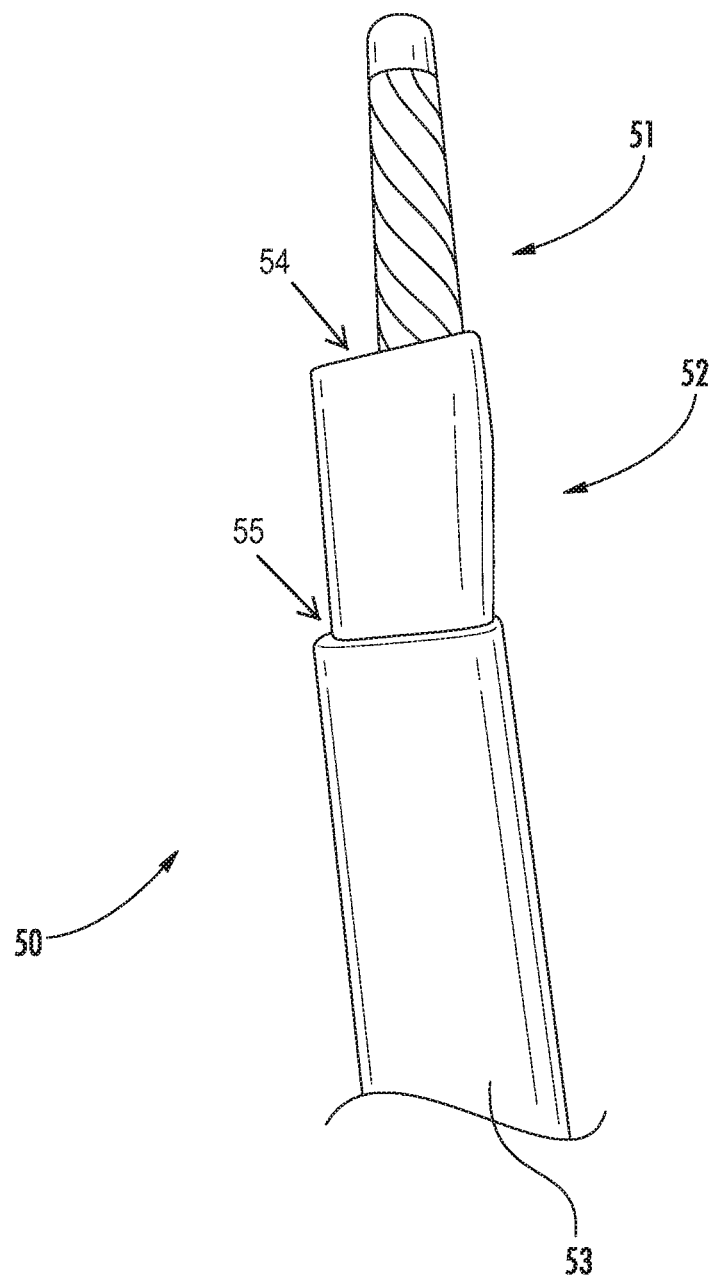
FIG. 17 is a view of an alternative embodiment of the apparatus of the present invention.

FIG. 17 shows an alternative construction of the apparatus of the present invention. In FIG. 17 there can be seen a restraint system cable or sling construction 50 that is preferably comprised of three elements or layers. These layers preferably include an outer layer 53, an inner element 51 and an intermediate layer 52 that can be in between the outer layer 53 and the inner element 51. The inner element is an inner core 51. Inner core 51 can be made of nylon, polyester, aramid, Vectran brand rope, high strength rope (such as Spectra brand rope (High Molecular Density Polyethylene) made by Yale or Dyneema brand rope (High Molecular Density Polyethylene), high tensile strength yarns, such as a woven rope or multiple ropes woven together, or yarns in an endless loop configuration, high strength rope in an eye to eye configuration (rope with an eye at each end). The inner core 51 is then preferably encapsulated or surrounded by a waterproof covering such as a urethane, polyurethane, rubber coating, waterproof covering or sleeve 52. The sleeve 52 is thus the intermediate sleeve or layer in between the inner core 51 and an outer layer, outer sleeve or covering 53.

The covering, outer sleeve or outer layer 53 is preferably a sleeve or encapsulation of double chafe sleeve material, such as nylon or polyester. The inner core 51 can preferably have a diameter of about ½-2 inches (1.27-5.08 cm), more preferably about ¾-2 inches (1.9-5.08 cm), most preferably about 1-1¾ inches (2.54-4.45 cm), for example 1⅛ inches (2.89 cm). The break strength in pounds (kilograms) half hitched on piping such as Chiksan® iron is about 133,610 pounds (60,604 kg) for a single run of 20 feet (6.1 m). The break strength in pounds (kilograms) half hitched on piping such as Chiksan® iron is about 260,120 pounds (117,988 kg) for a 1⅛ (2.89 cm) core 51 for a double run of 20 feet (6.1 m). Other break strengths for other sizes of inner core 51 can be as follows:

1 inch (2.45 cm) single run=100,190 pounds (45,445 kg);
1 inch (2.45 cm) double run=216,660 pounds (98,275 kg);
⅞ inch (2.22 cm) single run=93,040 pounds (42202 kg).

Notice in FIG. 17 that the intermediate layer or sleeve 52 does not necessarily have the exact same diameter as the inner core 51. In other words, there can be some air space 54 in between the core 51 and the sleeve 52. Similarly, there can be provided some air space 55 between the intermediate layer or sleeve 52 and the outer layer or sleeve 53. The covering or sleeve 52 can preferably have a diameter of about ¾-5 inches (1.9-12.7 cm), more preferably about 1-5 inches (2.54-12.7 cm), most preferably about 2½-4½ inches (6.35-11.43 cm), for example 3 inches (7.62 cm) (the covering is larger in diameter than core 51 as where core 51 joins to itself there is larger diameter area at that point). The covering or sleeve 52 can preferably have a wall thickness of 0.010-0.060 inches (0.0254-0.1524 cm), more preferably 0.015-0.060 inches (0.038-0.152 cm), most preferably 0.020-0.060 inches (0.051-0.152 cm), for example 0.020 inches (0.051 cm). The outer layer or sleeve 53 can preferably have a diameter of about ¾-5 inches (1.9-12.7 cm), more preferably about 1-5 inches (2.54-12.7 cm), most preferably about 2½-4½ inches (6.35-11.43 cm), for example 3 inches (7.62 cm). The covering or sleeve 53 can preferably have a wall thickness of 0.030-0.1 inches (0.08-0.254 cm), more preferably 0.050-0.099 inches (0.127-0.251 cm), most preferably 0.060-0.099 inches (0.152-0.251 cm), for example 0.060 inches (0.152 cm).

As with a preferred embodiment (e.g. FIG. 1) the cable or sling construction 50 can be formed in a loop, endless loop or loop sling such as endless loop sling 17. Core 51 would be spliced at its ends to form a loop. Sleeve 52 would overlap with one sleeve end of another sleeve 52 overlapping the other sleeve end of sleeve 52. An adhesive such as a waterproof adhesive, heat shrink wrap, or contact cement could then join the sleeve ends together for the sleeve 52. For a twenty foot (6.1 meters) endless loop sling, the sleeve ends of sleeve 52 could overlap three feet (0.91 meter) for example. Similarly, the sleeve 53 would overlap with one sleeve end overlapping the other sleeve end. An adhesive such as a waterproof adhesive, heat shrink wrap, sewn by thread, or contact cement could then join the sleeve ends together for the outer sleeve 53. Cable or sling construction 50 can also be formed in endless loop, spliced rope, or eye to eye constructions.

The following is a list of parts and materials suitable for use in the present invention:

PARTS LIST

Part Number Description
10 restraint system
11 high pressure flow line/pipe line/piping system
12 pipe section
13 pipe section
14 coupling/hammer union/fitting/elbow/tee/valve
15 hammer nut
16 projection
17 endless loop sling
17A first loop sling
17B second loop sling
17C third loop sling
18 cow hitch knot/girth hitch knot/sling hitch knot/knotted connection
19 arrow
20 first loop
21 second loop
22 arrow
23 shackle/disconnectable connector
24 bow
25 pin
26 wellhead
27 anchor
28 distance/interval
29 sling assembly
30 arrow
31 loop end portion
32 loop end portion
33 open center
34 connection to anchor
35 hitch or half hitch knot
36 hitch or half hitch knot
37 hitch or half hitch knot
38 arrow
39 arrow
41 anchor
42 connection
50 restraint cable/sling/loop sling
51 inner core
52 intermediate layer/sleeve
53 outer layer/covering/sleeve
54 air space
55 air space All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method for restraining a temporary flowline that includes multiple pipe sections, each pair of sections connected together with a disconnectable coupling, comprising the steps of:
   a) providing multiple assemblies of connected endless sling loops connected end-to-end with each said sling loop having end portions, wherein at least one of said end portions is secured to another of said slings;
   b) knotting the sling loops with knots to the flowline at intervals, with each knot formed by a portion of one of said endless sling loops that encircles the flowline; and
   c) wherein at least some of the sling loops have multiple layers: 1) a central core surrounded by one or more waterproof sleeves that disallow water flow to said core; and 2) an outer layer that surrounds the one or more waterproof sleeves and core.

2. The method of claim 1 wherein a disconnectable connector that is not a part of one of said sling loops joins one of said sling loops to another one of said sling loops.

3. The method of claim 2 wherein the disconnectable connector is a fitting having two parts comprising one part that disconnects from another part.

4. The method of claim 1 wherein there are at least two of said waterproof sleeves in step "c".

5. A restraint system for use in securing temporary flowlines that includes multiple pipe sections, each pair of sections connected together with one or more fittings to form a pipe assembly, the system comprising:
   a) an assembly of multiple slings or cables connected end-to-end, one of said slings or cables having end portions, at least one of said end portions is secured to another of said slings or cables;
   b) a plurality of disconnectable fittings that each join said assembly of multiple slings or cables to another assembly of multiple slings or cables;
   c) wherein each said disconnectable fitting is not a sling or cable;
   d) the slings or cables attached to the assembly of pipe sections and pipe fittings with knots at spaced apart positions along at least one of the temporary flowlines, each knot formed by a portion of one of said slings or cables that encircles at least one of the temporary flowlines; and
   e) wherein the slings or cables are of multiple layers: 1) a central core surrounded by a waterproof sleeve; and 2) and an outer layer that surrounds the waterproof sleeve and core.

6. The restraint system of claim 5 wherein each said disconnectable fitting is a shackle.

7. The restraint system of claim 5 wherein each said knot includes at least one 360° wrap of one of said slings or cables around the pipe assembly.

8. The restraint system of claim 5 wherein each assembly of slings or cables includes three or more endless loop slings or cables.

9. The restraint system of claim 8 wherein each assembly of slings or cables includes a sling that connects to two other side slings with first and second spaced apart cow hitch knots.

10. The restraint system of claim 5 wherein each said knot secures each assembly of slings or cables to one of said pipe sections and encircles one of the pipe sections multiple times next to one of said pipe fittings.

11. The restraint system of claim 5 wherein there are multiple spaced apart pipe fittings and at least one of said assemblies of multiple slings or cables encircles one of said pipe sections multiple times in between two of said spaced apart pipe fittings.

12. The restraint system of claim 5 wherein at least one of said assemblies of multiple slings or cables encircles one of said pipe fittings multiple times and on opposing sides of said pipe fitting.

13. The restraint system of claim 5 wherein the slings or cables are of differing lengths.

14. The restraint system of claim 5 wherein the slings or cables are of differing thicknesses or diameters.

15. A restraint system for use in securing temporary flowlines that includes multiple pipe sections, each pair of sections connected together with a fitting, the system comprising:
   a) multiple elongated cables or slings connected end-to-end, each cable or sling defined by a plurality of layers including an inner core layer, and an intermediate layer that encapsulates the inner core layer;
   b) wherein one of the layers is waterproof;
   c) a disconnectable fitting that joins an assembly of multiple cables or slings to another assembly of cables or slings;
   d) wherein each disconnectable fitting is not a cable or sling;
   e) attaching the assemblies to one or more of said temporary flowlines at intervals using knotted connectors that are each formed by a section of one of said cables or slings that encircles one or more of said temporary flowlines; and
   f) wherein the knotted connectors include one or more of said cables or slings tied to the piping system with half hitch knots.

16. The restraint system of claim 15 wherein each said disconnectable fitting is a shackle.

17. The restraint system of claim 15 wherein there are between 2 and 12 cables or slings in each assembly.

18. The restraint system of claim 15 wherein the knotted connectors include each cable or sling tied to one of said pipe sections next to one of said pipe fittings.

19. The restraint system of claim 18 wherein the inner core is of high strength woven rope material.

20. The restraint system of claim 18 wherein the intermediate layer is of a polyurethane material.

* * * * *